Feb. 20, 1968 W. R. BUTLER 3,369,337
OPEN GRID STRUCTURES
Filed June 28, 1965 3 Sheets-Sheet 2
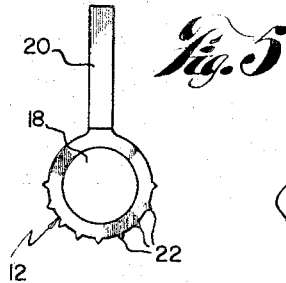
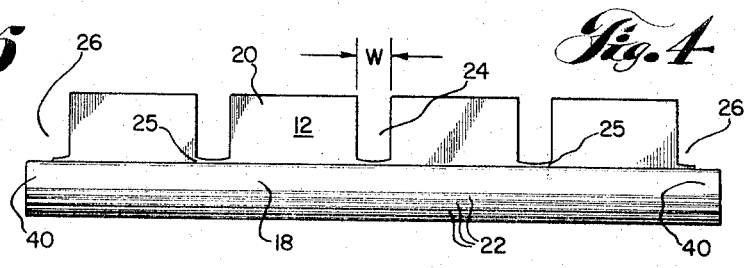
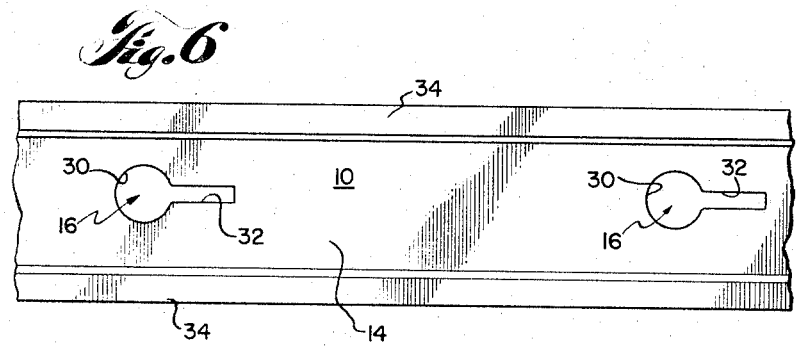
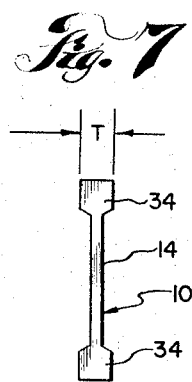
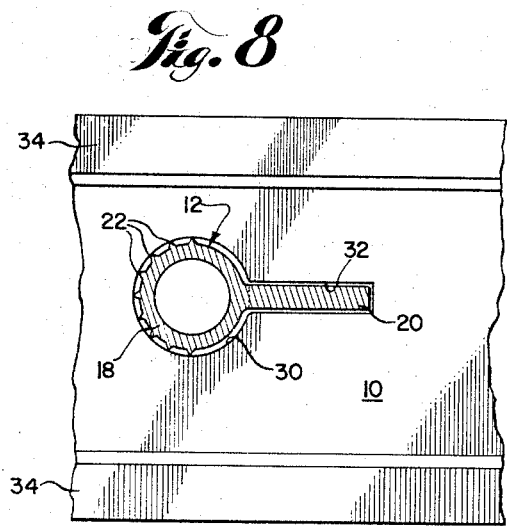
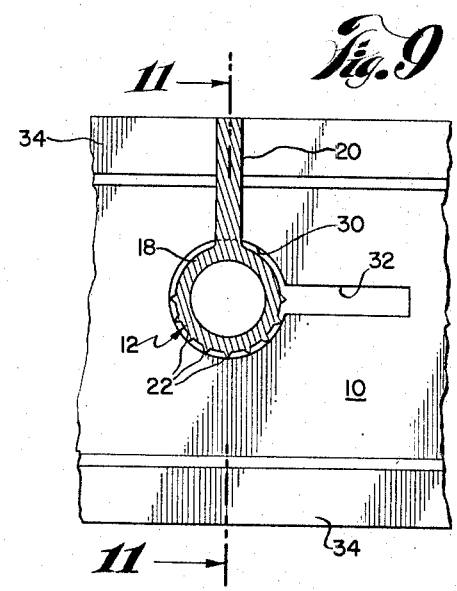
INVENTOR.
WILLIAM R. BUTLER
BY
ATTORNEY

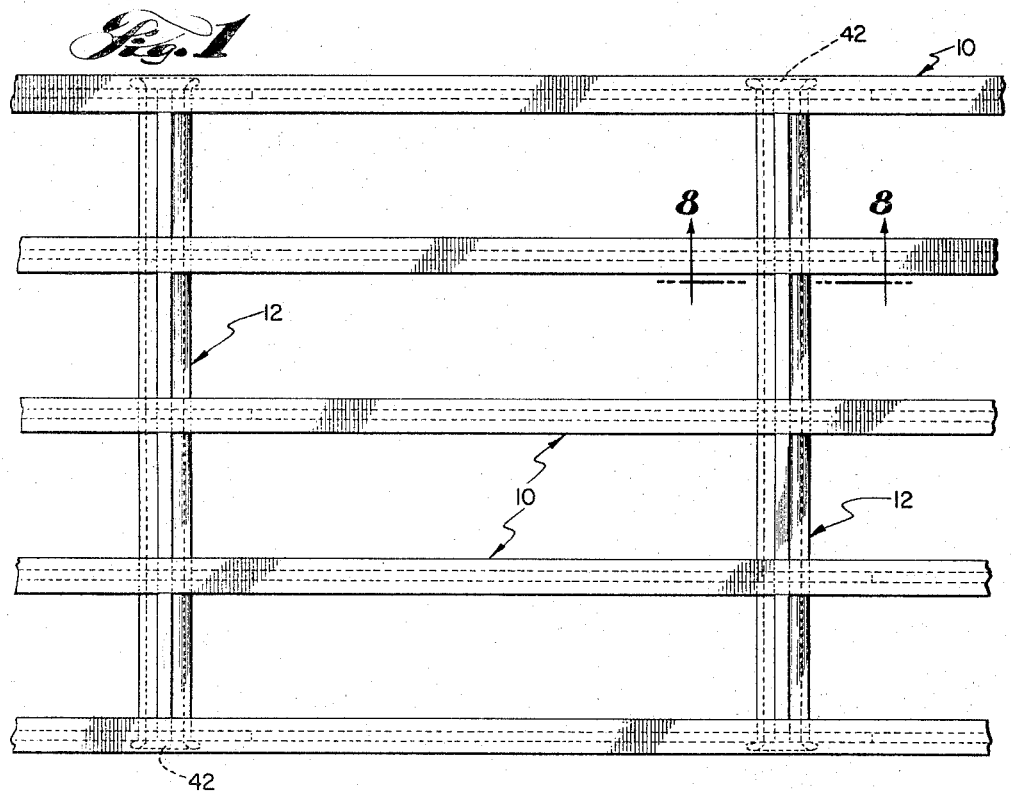
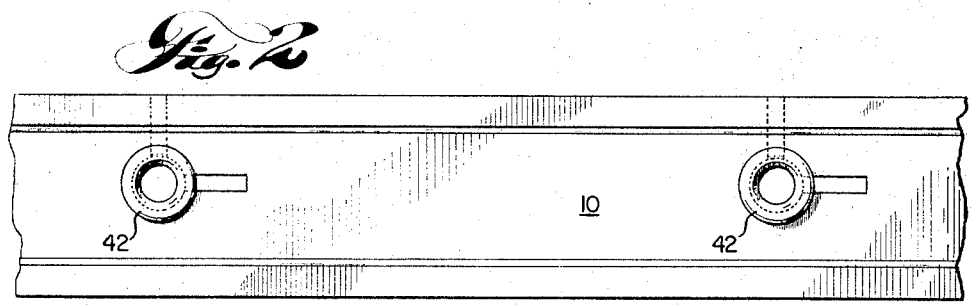
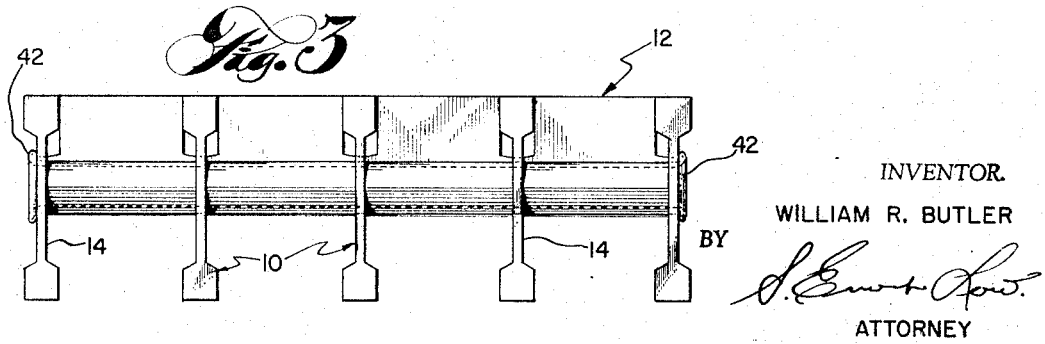
INVENTOR.
WILLIAM R. BUTLER

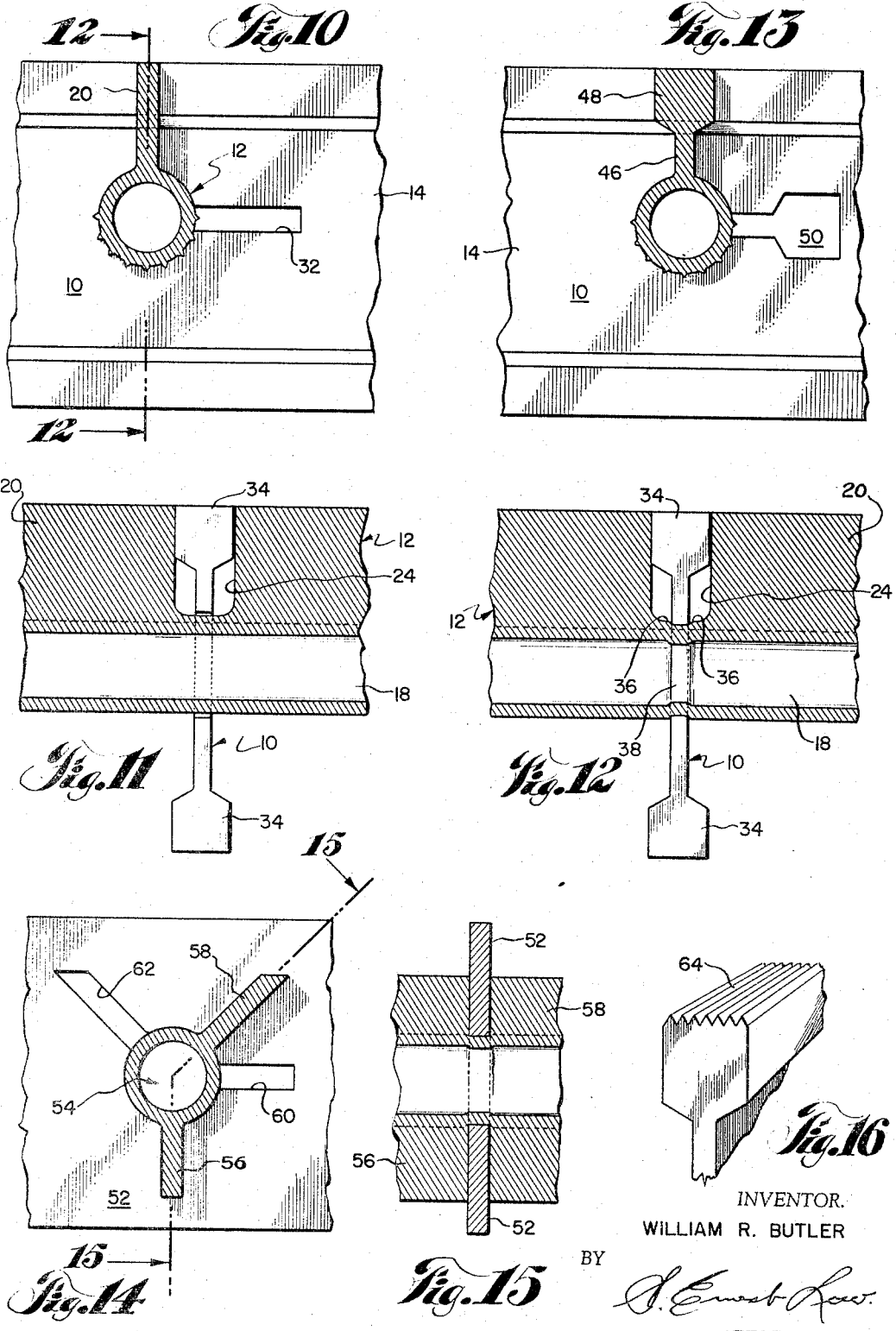

United States Patent Office 3,369,337
Patented Feb. 20, 1968

3,369,337
OPEN GRID STRUCTURES
William R. Butler, Pittsburgh, Pa., assignor to Aluminum Company of America, Pittsburgh, Pa., a corporation of Pennsylvania
Filed June 28, 1965, Ser. No. 467,198
8 Claims. (Cl. 52—667)

ABSTRACT OF THE DISCLOSURE

An open grid, such as a grille or grating, comprising spaced primary bar elements and spaced crossbar elements in transverse unitary interconnection. The crossbar elements are provided in tubular configuration having an extending flange axially along an outer surface thereof for introduction through substantially complementary aligned apertures in the spaced primary bar elements, the flange being slotted for rotation of the crossbar elements out of registry with the apertures receiving the same and thereafter outwardly expanded to provide a unitary integrated assembly of the primary and secondary bar elements.

---

This invention relates in general to unitary open grid or lattice type structures and gratings adaptable for use in architectural installations for providing interior partitions and dividers, and the like, as well as for exterior solar screens and overlays for existing walls and similar enclosing surfaces, where ornamental and self-supporting strength and rigidity are the chief desiderata. The products of the invention are also applicable in their use for load-supporting open grids, grilles and gratings, such as decks, shelving, stair treads, cat walks, and similar load and traffic-bearing areas, where strength and rigidity against direct and reverse bending are essential properties thereof.

The open grid or grille type structures of the invention are particularly adaptable in their fabrication from ferrous and non-ferrous metals and their alloys, as well as compatible combinations thereof, and where load-bearing strength is not a chief desideratum, may also be fabricated from conventional plastics, which inherently exhibit many of the hot and cold working characteristics of wrought metals and their alloys in substitution, in whole or in part, for an otherwise all metallic fabricated grille or grid satisfying the invention.

A prime object of the invention is to provide a unitary open grille or grid type panel, or structural grating, incorporating a minimum number of readily fabricated and standardized dissimilarly configurated elements responding in assembly to inexpensive fabricating techniques and equipment.

Another object of the invention is to provide a unitary open grille or grating panel devoid of riveted, bolted, welded, or any similar combination connections between the separate elements thereof.

An additional object of the invention is to provide a unitary open grille or grating panel incorporating dissimilarly configurated elements in integrated rigid assembly providing interlocked unitary structures substantially devoid of excessive dirt-collecting surfaces, such as would be produced by outstanding burrs, unsightly upset areas, and/or angularly projecting flat and/or undulating and reentrant surfaces, whereby the fabricated end products of the invention find ready decorative and/or load-bearing adaptation in hospitals, food-packaging and similar treatment plants, and the like, where facile cleaning and hygienic conditions are of prime significance.

Other objects and advantages of the invention will become apparent to those skilled in the art to which the invention appertains on consideration of the following detailed description and appended exemplary illustrations, in which:

FIG. 1 illustrates a top or front plan view of a fragmentary area of a unitary open grille or grating constructed in accordance with a preferred practice of the invention;

FIG. 2 illustrates a side elevational view of the grating of FIG. 1;

FIG. 3 illustrates an end elevational view of the grating of FIG. 1;

FIG. 4 illustrates a side elevational view of a crossbar element of the grille or grating of the unitary assembled product of FIGS. 1, 2 and 3;

FIG. 5 illustrates an end elevational view, to enlarged scale, of the element of FIG. 4;

FIG. 6 illustrates a side elevational view of a primary load-bearing or longitudinal bar element of the unitary assembled product of FIGS. 1, 2 and 3;

FIG. 7 illustrates an end elevational view of the element of FIG. 6;

FIGS. 8, 9 and 10 illustrate three successive fragmentary sectional elevational views, to enlarged scale, depicting initial to final integrated assembly of the unitary grille or grating of FIGS. 1, 2 and 3, taken on the plane 8—8 of FIG. 1;

FIG. 11 illustrates a sectional elevational view taken on the plane 11—11 of FIG. 9;

FIG. 12 illustrates a sectional elevational view taken on the plane 12—12 of FIG. 10;

FIG. 13 illustrates a view similar to FIG. 10 showing a modified version of grating falling within the scope of the invention;

FIG. 14 illustrates a view similar to FIG. 10 showing a further embodiment of the invention;

FIG. 15 illustrates a partial sectional elevational view taken on the plane 15—15 of FIG. 14; and FIG. 16 illustrates a fragmentary perspective view of a modified version of one or both major elements incorporated in grilles or gratings of the invention.

Open grilles, gratings, and grid type structures satisfying the invention basically include a plurality of preferably substantially identical bar elements, or members, termed generically herein primary bar elements, and specifically load-bearing bars or elements in the case of load and/or traffic-bearing open type grids, grilles or gratings, arranged in substantially parallel spaced relationship. In addition, a plurality of cross-lacing secondary or crossbar elements or members, of preferably right cylindrical tubular body configuration incorporating at least one suitably recessed integral rigid radially outwardly extending web or flange, are provided which are insertable through and receivable within aligned clearance apertures disposed within the depth dimension of the aforesaid primary elements; are thereafter angularly twisted or oscillated, as by partial rotation thereof, out of registry of the integral extending web thereof with a contiguous radially slotted area of the aforesaid apertures; and the crossbars in their latter position outwardly expanded over the axial length of their tubular body configuration to unitarily and transversely cross-lace the primary bar elements in spaced planes along the axial length thereof within the apertures therewithin.

In more specific terms, and still exemplary of the invention, the primary and/or load-bearing bar elements are usually selected to provide an axially uniform substantially rectangular transverse cross-section, but may, if desired, be otherwise configurated to provide other axially uniform transverse cross-sections, such as an I-transverse cross-section. The secondary crossbar elements are also usually each selected in axially uniform transverse tubular body cross-section and are characterized by carrying at least one integral outwardly extending web or flange over the axial length thereof, the web or flange being recessed or inwardly slotted from the outward or free edge thereof inwardly toward the tubular body supporting the same, at axially spaced intervals, to permit angular oscillation or rotation of the crossbar elements from their initial registered threaded position within the aligned apertures in the primary bar elements to some position out of initial registry of their extending flange or flanges therewithin into accommodation of imperforate portions of the primary elements within the recessed slots in the crossbar elements in an assembly of the grating products of the invention. It will be manifest, as is the case of the primary bar elements, that the crossbar elements may be of dissimilar transverse cross-section in regard to each individual crossbar, the essential requirement being that their characterizing tubular body portions, and radial flange or flanges carried thereby, are axially uniform in respect to each individual crossbar element.

In the oscillated or rotated disposition of the tubular crossbar elements, i.e., with the recessed integral radial flange or flanges thereof out of registry with the slotted areas of the apertures within the primary bar elements initially receiving the same, the tubular bodies of the crossbar elements or members are thereafter outwardly expanded from the interior thereof into interlocking and binding engagement of the exterior surface of the tubular body portions thereof, in coextensive contact with that portion of the wall area of the apertures initially receiving the tubular body portions of the crossbar elements.

In more specific terms, and referring to the particular embodiment of the invention illustrated in FIGS. 1 through 12, a grille, grid or grating product is therein illustrated as comprising a plurality of similar primary or load-bearing bar members 10 of generally I-section preferably arranged in spaced parallel coplanar disposition which are cross-laced in unitary rigid assembly by means of similar tubular bodied and radially flanged crossbar elements 12 in preferably axially normal disposition to the aforesaid primary bar members 10.

The primary bar members 10 are suitably punched, drilled, and/or otherwise machined, within the web depth 14 thereof to provide generally key-hole shaped apertures 16 (FIG. 6) in predetermined selected axial spacing, the aforesaid key-hole configuration of the apertures 16 being purposely selected in complementary clearance-providing outline to the exterior configurating outline of the crossbar elements 12 axially and freely receivable therewithin.

The similar crossbar elements 12 (FIGS. 4 and 5) are selected in the form of a tubular, and preferably substantially right cylindrical, body portion 18 having at least one integral radially outwardly extending web or flange 20, and the body portion thereof may if desired be axially grooved or serrated on its exterior surface at 22 below a diameter thereof normal and remote to the radially extending flange 20, the purpose of which will be hereinafter explained. In addition, the flange 20 is inwardly recessed or slotted at 24 in axial spaced relationship to register with the desired spacing between the primary bar members 10, with the terminal ends of the flange 20 removed at the notched areas 26 for end securement of the assembled grille, as will be hereinafter explained.

On specific reference to FIGS. 6, 8 and 9, it will be observed that the circular outline 30 of the apertures 16, extending through the web 14 of each of the primary bar members 10, is slightly oversize in substantial coincidence to a concentric circumferential trace defining the outer tips of the outstanding substantially triangular ribs 22 forming serrations therebetween and carried on the exterior wall of the tubular body portion 18 of the crossbar elements 12 (FIG. 5). In fact, the oversize clearance circular trace or outline 30 of the apertures 16, with or without the presence of the projecting ribs constituting the serrations 22, is beneficial in that it permits a radial depth of the slots or recesses 24 in the flanges 20 of crossbar elements 12 which insures a strength providing imperforate root area 25 for each of the slots 24 (FIG. 4). Manifestly, the ribs 22 can be dispensed with, if desired, in which case the oversize curvilinear clearance of each of the apertures 16, as well as the radial depth of the imperforate root area 25, would be proportionally reduced. Similar oversize clearance is also preferably provided in respect to the rectangularly slotted contiguous area or outline 32 of the apertures 16 providing perimetrical clearance for each web or flange 20 of the crossbar elements 12. The aforesaid clearance relationship between the walls defining contiguous outline of apertures 16 and exterior configurating outline of the crossbar elements 12 assures ready and unobstructed axial threading initial assembly of the crossbars 12 within the aligned apertures 16 without recourse to special jigging and tooling costs, whether initial threading assembly of the crossbar elements 12 within the apertures 16 in a manual or machined operation.

Following axially free clearance relationship insertion of the crossbar elements 12 within the registered apertures 16 in the webs 14 of adjacent spaced load-bearing or primary bar members 10, best illustrated in FIG. 8, the crossbars 12 are rotated or oscillated through some angle, such as 90°, to a location thereof depicted in FIG. 9, in which latter position the maximum width W of the inwardly directed recesses or slots 24 in the flanges 20 of the crossbars 12 has been illustrated and selected to register with and accommodate the maximum thickness T across the transverse thickness of the flanges 34 of the primary elements 10. Manifestly, the selection of an arc of oscillation or rotation of the crossbar elements 12 less or more than the 90° location would be optional, particularly in the fabrication of angularly disposed louvered screens and similar architectural products. In the case of load-bearing gratings, on the other hand, the 90° position of the webs 20 of FIGS. 8 through 12 would be characteristic thereof. In any event, the width W of the slots or recesses 24 is selected to accommodate the maximum transverse thickness of the primary bar elements 10 during oscillation or rotation from initial to final disposition of the crossbar elements 12 in the products of the invention.

In reference to the dimensional relationship between the width W of the slots or recesses 24 and transverse thickness dimension T of the primary bar elements 10, relatively small lateral clearance or a slight interference press fit therebetween may be employed, it being a desirable characteristic that the cruciform areas of the open type grilles or gratings of the invention be substantially devoid of unsightly burrs and upset or protrudingly disposed or torn material.

Final integrated rigid assembly of the aforesaid grille or grating structure of the invention is accomplished by outward expansion of the tubular body portions 18 of the crossbar elements 12 from their partially rotated clearance disposition in FIG. 11 to that illustrated in FIG. 12. It has been observed in the practice of the invention that expansion of the tubular body portion 18 of the crossbar elements 12 results in substantially uniform outward expansion of the interior and exterior surfaces of the tubular body portion 18 of each crossbar 12 over the axial length thereof except in the immediate coextensive areas of the curvilinear portions 30 of the apertures 16 in the primary bar elements 10, which latter curvilinear wall portions 30 serve to resist and restrict the outward expansion of the tubular body portions 18 (FIG. 12) to the extent of producing the substantially annular inwardly directed interior rib 38 underlying the circular wall of portion 30 of each of the apertures 16 in the load-bearing or primary bar elements 10.

The extent of inward projection and amount of material constituting the inwardly directed rib 38 is controlled by one or more of several factors including the yield strengths of the materials, of the primary and crossbar elements 10 and 12, respectively, the initial gap or clearance between the axially uniform tubular body of the crossbar elements 12, and the circular wall defining portion 30 of the apertures 16, whether similar or dissimilar material are selected for the primary and crossbar elements, as well as to the extent to which the interior diameter of the tubular body portion 18 of the crossbar elements 12 is increased during expansion thereof. In any event, the primary bar elements 10 end up in rigidly clamped interlocked assembly within axially spaced grooves on the exterior surface of the expanded tubular body portions 18 of the cross bar elements 12 formed by the outer expanded circumference 36 thereof.

Presence of the axially extending outstanding ribs 22 forming the serrations therebetween also serve to increase the interlocking effectiveness of the cruciform joints formed between the primary and secondary crossbar elements 10 and 12, respectively, as would the previously mentioned press fit dimensional relationship between the width W of web recesses 24 and transverse width T dimension of the flanges 34 of the primary elements 10. In the case of the 90° disposition of the webs 20 of crossbar elements 12, as illustrated in FIGS. 1 through 12 for use of the grating thus formed as a load-bearing grating, confinement of the ribs 22 to the underside of the tubular body portions 18 of the crossbar elements 12 reduces the surface areas capable of collecting extraneous dust and foreign materials.

Numerous techniques and conventional equipment are available for applying interior pressure to expand the tubular body portions 18 of the crossbar elements 12 into binding mechanical interlocking connection with the circular openings 30 in the webs 14 of the primary bar elements 10, and form no part of the present invention. Furthermore, the terminally notched flange 20 of the crossbar elements 12, at 26 (FIG. 4), providing the extensions 40 of the tubular bodies 18 of the crossbar elements 12 through the apertures 16 in the outermost primary bar elements 10, are outwardly spun, upset or curled, or otherwise flanged at 42 in any well-known manner, to mechanically lock the outermost primary bar elements 10 in the open grille, grid or grating structures of the invention, as best structurally revealed in FIGS. 1, 2 and 3.

FIG. 13 represents a slight departure and modification from the open grid structure of FIGS. 1 through 12. In FIG. 13 the radially extending flange 46 is provided with an enlarged terminal flange 48 which has necessitated an enlarged counterpart thereof at 50 in the contiguous recess in the primary bar element 10 initially receiving the same. The structure of FIG. 13 is otherwise fabricated in the same manner described for the product of FIGS. 1 through 12.

In FIGS. 14 and 15 a further embodiment of the invention is illustrated in which the primary bar elements 52 are of axially uniform rectangular transverse cross-section and the right cylindrical tubular crossbar elements 54 may have one or more radially extending webs or flanges. To more particularly illustrate versatility in selecting the webs or flanges of the crossbar elements 54, one flange 56 has been illustrated in angular relationship to the second flange 58, it being understood that one or both flanges 56 and 58 may be employed. Also, the radially extending recesses 60 and 62, for initially receiving the flanges 56 and 58, respectively, are illustrated in their location in the primary bar elements 52 before partial rotation of the flanges 56 and 58 out of registry therewith and subsequent expansion of the tubular body portion of the crossbar elements to the final interlocked assembly thereof in FIGS. 14 and 15. It will be manifest in this regard that the finally disposed and interlocked flange 58, if employed alone in FIGS. 14 and 15, would serve to provide a louvered grille or lattice with angularly disposed vanes formed by the crossbar elements 54 and angularly disposed flanges 58.

FIG. 16 is representative of a surface treatment for the outer edges of the primary and/or crossbar elements of any one or all of the grid or grating structures hereinabove described by providing serrations 64, which are readily producible in initial extrusion, rolling, or similar conventional fabricating processes employed in their production. The serrations 64 can be provided for decorative and/or anti-skid purposes.

It will be observed that the open type grid products of the invention illustrated in FIGS. 1 through 12, as well as that of FIG. 13, have the tubular bodied crossbar elements thereof, as well as the apertures in the primary bar elements 10 initially receiving the same, out of coincidence with the neutral or central horizontal axis of each of the bar elements 10. This construction manifestly reduces the radial length of the webs or flanges 20 and 46, as well as the radial length of the recesses in the primary bar elements 10 initially receiving the same, and will result in reducing the weight per unit area of the grille or grating thus constructed. However, the apertures in the primary or load-bearing bar elements 10 and 52 for initial reception of their secondary crossbar elements would preferably be located in coincidence with and symmetrical in respect to the neutral axis of the primary load-bearing bars for maximum strength and load-bearing capacity, as in traffic-bearing gratings.

Manifestly, the invention lends and adapts itself to various modifications of the above-described specifically selected embodiments thereof. For example, the primary or load-bearing bar elements can be of different axially uniform transverse cross-section, as can be the secondary crossbar elements, in any one selected area of open type grid or grating structure. Preferably, however, the uppermost traffic-contacting surface of a load-bearing grating should be coplanar in respect to its primary and secondary bar elements.

A laboratory test program was conducted on grating fabricated in accordance with the above-described invention employing the grating of FIGS. 1 through 12. The tested grating incorporated primary I-bar elements 10 each 1½ inches deep over their flanges 34 and otherwise substantially dimensionally proportional to the scale thereof illustrated in FIGS. 6 and 7.

The crossbar elements 12 were each of right cylindrical tubular body form of ⅜ inch outside diameter, included the ribs 22 and flange 20, and were also otherwise substantially dimensionally proportional to the scale thereof illustrated in FIGS. 4 and 5.

The integrated assembled grating comprised eleven equispaced parallel I-beam elements 10 extruded from 6061–T6 aluminum alloy, and thirteen equispaced parallel crossbar elements 12 extruded from 6063–T5 aluminum alloy, the latter bars having been inserted through provided apertures in the I-bar elements 10 in four inch axially spaced center to center arrangement thereof.

The assembled grating was rectangular in outline and measured one foot wide transversely across the I-bar elements 10 and four feet two inches along the length thereof.

Positive and negative simple bending tests were carried out on a three foot and two foot four inch span, respectively, of the grating, the positive bending test having the flanges 20 of the tubular crossbar elements 12 directed vertically upwardly, whereas in the negative test the grating was reversed. Incrementally increasing applied loading was exerted across the one foot width of the grating centrally between the midspan adjacent crossbar elements 12 in the positive and negative bending tests and deflection measurements recorded at midspan in each of the tests.

Analysis of the results of the bending test program above described clearly established bending strengths in both tests providing quite favorable factors of safety of at least three against failure of the grating within in allowable design stress of 12,000 pounds per square inch.

Manifestly, this test program is exemplary of, and in no way limits, the scope and intent of the invention.

It will be observed that the invention is expressible in terms of an open grid structure definable in terms of primary and secondary bar elements in transversely arranged open grid spaced assembly in which the secondary elements are configured to provide an axially tubular body portion having an outwardly extending flange axially along an outer surface thereof; the secondary elements being each receivable within registering substantially complementary clearance-providing apertures extending transversely through each of the primary elements; the flange of each secondary element being provided with axially spaced outwardly open slots to accommodate each of the spaced primary elements in press fit relationship on rotation of the secondary elements out of registration of the apertures initially receiving the same; and the rotated secondary elements being expanded into clamping surface engagement with the walls of the apertures coextensive therewith, as well as outwardly expanded over the axial lengths thereof between adjacent pairs of the primary elements.

While specific embodiments of the invention have been selected, illustrated and described hereinabove in practical and useful detail, it will be manifest to those skilled in the art, to which the invention is addressed, that numerous variations may be made without departing from the intent and scope of the invention hereinafter claimed, as follows:

1. An open grid structure of the class described comprising a plurality of spaced primary bar elements each having an axially uniform transverse cross-section and a plurality of spaced transverse secondary crossbar elements each having an axially uniform transverse cross-section adapted to unitarily connect said primary bar elements in rigid integrated structural unitary assembly, each of said crossbar elements being defined by a tubular body portion having at least one radially outwardly extending web portion, axially spaced apertures providing a right cylindrical wall and contiguous radial slot transversely through the transverse thickness dimension of each of the spaced primary bar elements confined within the depth of the same, said apertures in registered alignment thereof being substantially complementary in clearance-providing contiguous enclosing outline to the exterior configuration of one each of the crossbar elements and receiving the latter extending therethrough, the radially outwardly extending web of each of the crossbar elements being provided with axially spaced outwardly open slots interrupting the axial length thereof which, on partial rotation of the crossbar elements, accommodate the transverse thickness dimension of one each of the spaced primary bar elements adjacent thereto in press fit engagement therewith, and said crossbar elements following partial rotation being right-cylindrically outwardly expanded over the axial lengths thereof between adjacent pairs of spaced primary bar elements as well as into clamping surface engagement of their outer tubular surfaces coextensive with the overlying surface defining one each substantially complementary right cylindrical aperture in the spaced primary bar elements receiving each crossbar element to thereby firmly and permanently secure the unitarily connected primary and secondary elements in unitary integrated open grid structure.

2. An open grid structure of the class described comprising a plurality of spaced similar primary bar elements of axially uniform generally rectangular transverse cross-section and a plurality of spaced transverse similar secondary crossbar elements of axially uniform transverse cross-section adapted to unitarily connect said primary bar elements in rigid integrated structural unitary assembly, said crossbar elements being defined by a right cylindrical tubular body portion having at least one radially outwardly extending web portion, axially spaced apertures each providing a right cylindrical wall and contiguous radial slot transversely through the transverse thickness dimension of the spaced primary bar elements confined within the depth of the same, said apertures being substantially complementary in contiguous enclosing outline to the exterior configuration of each of the similar crossbar elements and threadingly receiving the latter extending freely therethrough with the radially outwardly extending web portions thereof disposed within the depth of the primary bar elements, the radially outwardly extending web of each of the crossbar elements being provided with axially spaced outwardly open similar slots interrupting the axial length thereof, said freely threaded crossbars responding on partial rotation thereof developing a slight interference fit between the slots in the webs thereof and thickness of the similar primary bar elements accommodating the same, and said crossbar elements following partial rotation being right cylindrical outwardly expanded over their tubular body portions between adjacent pairs of the primary bar elements as well as into clamping surface engagement of their right cylindrical outer surfaces coextensive with the overlying surface defining each aperture in the spaced primary bar elements to thereby firmly and permanently secure the unitarily connected primary and secondary elements in integrated open grid structure.

3. An open grid structure of the class described comprising a plurality of parallel spaced primary bar elements each being axially uniform in transverse cross-section and a plurality of parallel spaced transverse secondary crossbar elements each being axially uniform in transverse cross-section and adapted to unitarily connect said primary bar elements in rigid integral structural unitary assembly, each of said crossbar elements being defined by a substantially right cylindrical tubular body portion having at least one radially outwardly extending flange carried thereby, said primary bar elements being each provided with spaced apertures between the marginal edges defining the maximum depth thereof, the apertures in registered alignment thereof being substantially slightly oversize and complementary to the axially uniform exterior transverse configuration of a crossbar element threaded therethrough in free clearance relationship thereto, open entry recesses in spaced location in the outwardly extending flange carried by each crossbar element interrupting its otherwise continuous length, said recesses having a maximum width in the axial direction of the flange at least equal to that of the maximum short dimension thickness of each of the primary bar elements parallel to the axes of the apertures therethrough, the tubular body portion of each of said crossbar elements being serrated on the outer surface thereof remote to the outwardly extending flange carried thereby, said crossbar elements on partial rotation to relocate the flanges thereof out of registration with the apertures receiving the same establishing a slight interference substantially burrless fit between the open entry recesses and maximum thickness of imperforate areas of the primary bar elements, and said tubular body portions of the crossbar elements being outwardly expanded between adjacent pairs of the primary bar elements to complete final rigid interlocking integrated assembly of the open grid structure.

4. An open grid structure of the class described comprising a plurality of parallel spaced primary bar elements of axially uniform transverse I-section and a plurality of parallel spaced transverse secondary crossbar elements of axially uniform transverse cross-section adapted to unitarily connect said primary bar elements in cross-laced rigid integral unitary assembly, each crossbar element being defined by a substantially right cylindrical tubular body portion having a radially and axially extending web carried thereby from the outer surface of the body portion, marginally open axially spaced recesses in said radially extending web, axially spaced apertures through the web of each primary bar element, each aperture having a clearance-providing outline contiguous to the outline of the uniform transverse cross-section of the crossbar elements, said crossbar elements being axially insertable through the apertures in the parallel spaced primary bar elements in axial registration with said apertures and partially rotated therein to shift the webs of the crossbar elements out of registry from their inserted position to accommodate imperforate areas of the I-section transverse cross-section of each primary bar element within the recesses in the webs of the crossbar elements in press fit relationship, said radially extended webs of the crossbar elements in shifted position having their outer marginal edges substantially coplanar with outwardly facing surfaces of the flanges of the I-section primary bar elements, and said tubular body portions of the crossbar elements being outwardly expanded into tight engagement within the apertures in the primary bar elements as well as outwardly expanded between adjacent pairs of the primary bar elements to thereby lock the grid structure in unitary assembly.

5. The open grid structure of claim 4 in which the surface of the tubular body portion of each of the crossbar elements is axially serrated below a diameter thereof substantially normal to the radially extended web thereof and the apertures in the primary bar elements circumferentially trace the axial serrations.

6. An open grid structure of the class described comprising a plurality of parallel spaced primary bar elements of axially uniform transverse I-section and a plurality of parallel spaced tranverse secondary crossbar elements of axially uniform transverse cross-section adapted to unitarily connect said primary bar elements in cross-laced rigid integral unitary assembly, each crossbar element being defined by a substantially right cylindrical tubular body portion having a radially axially extending web carried thereby from the outer surface of the body portion, marginally open axially spaced recesses in said radially extending web, axially spaced apertures through the web of each primary bar element, each aperture having an outline contiguous to and in clearance relationship with the outline of the transverse cross-section of the crossbar elements disposed symmetrically in respect to the neutral axis of the primary bar elements, said crossbar elements being axially insertable through the apertures in the parallel spaced primary bar elements in axial registration of said apertures and partially rotatable therein to shift the webs thereof out of registry from their inserted position to accommodate imperforate areas of the I-section transverse cross-section of each primary bar element within the recesses in the webs of the crossbar elements, said radially extended webs of the crossbar elements in shifted position having their outer marginal edges substantially coplanar with outwardly facing surfaces of the flanges of the I-section primary bar elements, and said tubular body portions of the crossbar elements being outwardly right cylindrically expanded into tight engagement within coextensive surfaces of the apertures in the primary bar elements and similarly outwardly expanded between adjacent pairs of the primary bar elements to thereby lock the grid structure in unitary assembly.

7. An open grid structure of the class described comprising a plurality of parallel spaced primary bar elements of axially uniform transverse cross-section and a plurality of parallel spaced transverse secondary crossbar elements of axially uniform transverse cross-section adapted to unitarily connect said primary bar elements in cross-laced rigid integral unitary assembly, each crossbar element being defined by a substantially tubular body portion having a radially and axially extending web carried thereby from the outer surface of the body portion, marginally open axially spaced recesses in said radially extending web, said recesses each having a slight clearance width in respect to the axially uniform transverse width of the primary bar elements, axially spaced apertures through the web of each primary bar element, each aperture having an outline contiguous to and in clearance relationship with the outline of the axially uniform transverse cross-section of the crossbar elements, said crossbar elements being freely axially insertable through the apertures in the parallel spaced primary bar elements and rotatable therein to shift the webs thereof out of registry from their inserted position to accommodate imperforate areas of the transverse cross-section of each primary bar element within the recesses in the webs of the crossbar elements, said radially extended webs of the crossbar elements in shifted position being angularly disposed in respect to a plane coplanar with outwardly facing surfaces of the primary bar elements, and said tubular body portions of the crossbar elements being outwardly expanded into tight engagement within the apertures in the primary bar elements as well as outwardly expanded between adjacent pairs of the primary bar elements to thereby lock the grid structure in unitary assembly.

8. An open grid structure of the class described comprising a plurality of spaced primary bar elements and a plurality of spaced transverse secondary crossbar elements adapted to unitarily connect said primary bar elements in rigid unitary structural assembly, each of said crossbar elements being defined by an axially extending tubular body portion having at least one radially outwardly extending contiguous web portion, the primary bar elements being of generally rectangular transverse cross-section, axially spaced apertures transversely through the transverse thickness dimension of each of the spaced primary bar elements confined within the depth of the same, each of said apertures in registered alignment thereof in the spaced primary bar elements being substantially complementary in contiguous transverse enclosing outline to one of the crossbar elements axially receivable therewithin and extending axially therethrough with the radially outwardly extending web of each of the crossbars disposed within the depth of the primary bar elements, the radially outwardly extending web of each of the crossbar elements being provided with axially spaced outwardly open slots interrupting the axial length thereof which, on partial rotation of the crossbar elements, accommodate the transverse thickness dimension of one each of the spaced primary bar elements adjacent thereto in press fit relationship, and said crossbar elements following partial rotation being outwardly expanded over their tubular body portions into clamping surface engagement of their outer tubular surfaces coextensive with the overlying surface defining one each substantially complementary aperture in the spaced primary bar elements receiving each crossbar element as well as being outwardly expanded between adjacent pairs of the primary bar elements to thereby firmly and permanently secure the unitarily connected primary and secondary elements in integrated open grid structure.

References Cited
UNITED STATES PATENTS

| | | | |
|---|---|---|---|
| 1,132,021 | 3/1915 | Mark et al. | 52—667 |
| 1,734,660 | 11/1929 | Williams et al. | 52—669 |
| 1,946,035 | 2/1934 | Renter | 52—667 X |
| 2,617,503 | 11/1952 | Nagin | 52—667 X |
| 3,177,990 | 4/1965 | Flucker et al. | 52—667 |
| 3,284,975 | 11/1966 | Averill | 52—669 X |

DAVID J. WILLIAMOWSKY, *Primary Examiner.*

PHILLIP C. KANNAN, *Assistant Examiner.*